United States Patent [19]

Butler et al.

[11] 4,027,628

[45] June 7, 1977

[54] AUTOMATIC FEEDING SYSTEM FOR GESTATING LIVESTOCK

[76] Inventors: Robert M. Butler; John T. Butler; James G. Butler, all of Box 221, Rte. 1, Austin, Minn. 55912

[22] Filed: Jan. 12, 1976

[21] Appl. No.: 648,192

[52] U.S. Cl. .............................. 119/52 B; 119/53
[51] Int. Cl.² .................................... A01K 5/00
[58] Field of Search ............... 119/52 B, 53, 51 R, 119/51.5, 52 R, 52 AF, 56 R; 198/56–58, 66, 64

[56] References Cited

UNITED STATES PATENTS

| | | | |
|---|---|---|---|
| 3,087,461 | 4/1963 | Strand | 119/52 B |
| 3,202,130 | 8/1965 | Sutton | 119/52 B |
| 3,211,339 | 10/1965 | Piper et al. | 119/56 R |
| 3,465,725 | 9/1969 | Maclay | 119/52 B |
| 3,587,529 | 6/1971 | Wienert | 119/52 B |

FOREIGN PATENTS OR APPLICATIONS 34,979  2/1965  Germany .......................... 119/52 B

*Primary Examiner*—J.N. Eskovitz
*Attorney, Agent, or Firm*—Merchant, Gould, Smith, Edell, Welter & Schmidt

[57] ABSTRACT

An open framework defining a pair of rows of stalls for livestock, a feeding hopper movable over the rows of stalls and having a pair of food material discharge openings each disposed to deliver food to the stalls of a different row. A pair of feeding conveyors in the hopper each feed material to a different one of the discharge openings and are independently driven and independently controlled by control elements causing the material to be discharged to predetermined ones only of the stalls. The framework includes longitudinal frame sections which provide gates to each of the stalls individually.

2 Claims, 8 Drawing Figures

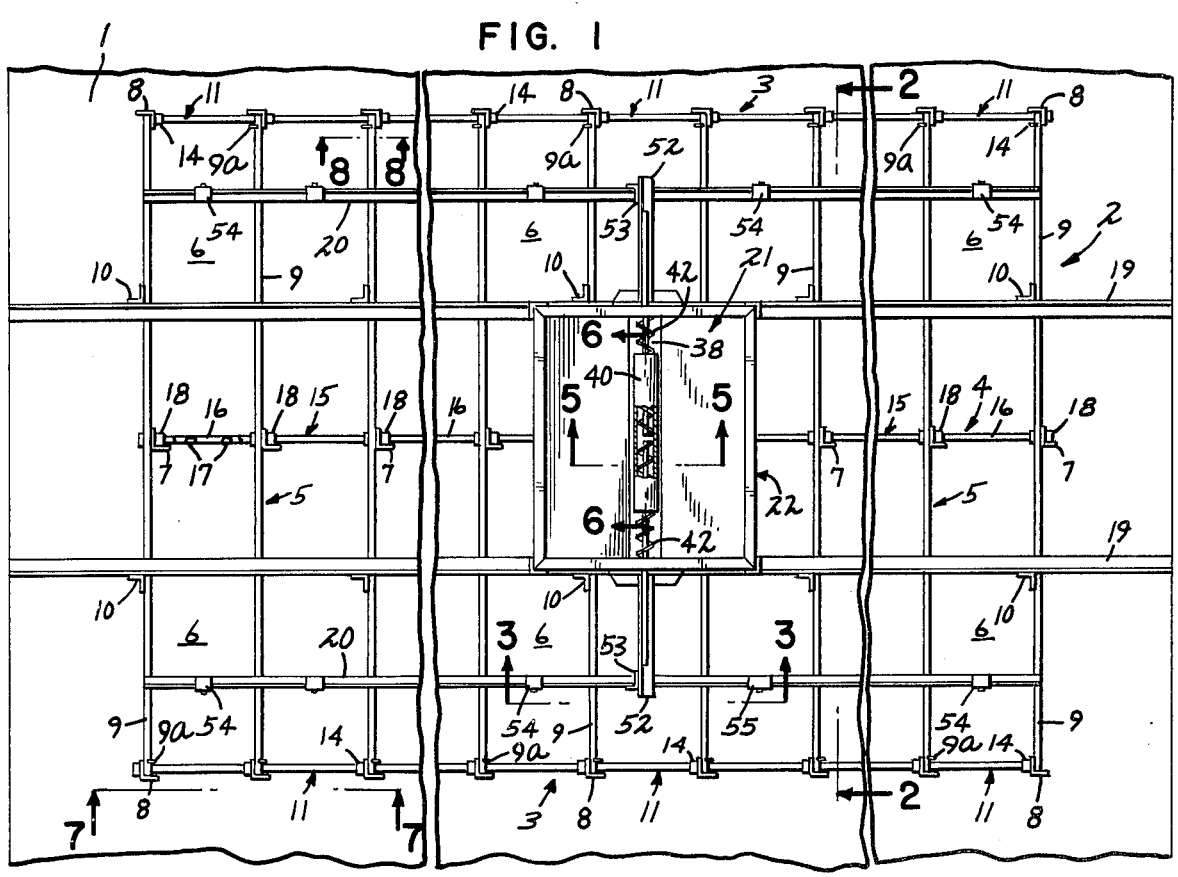
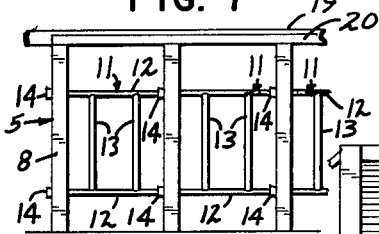
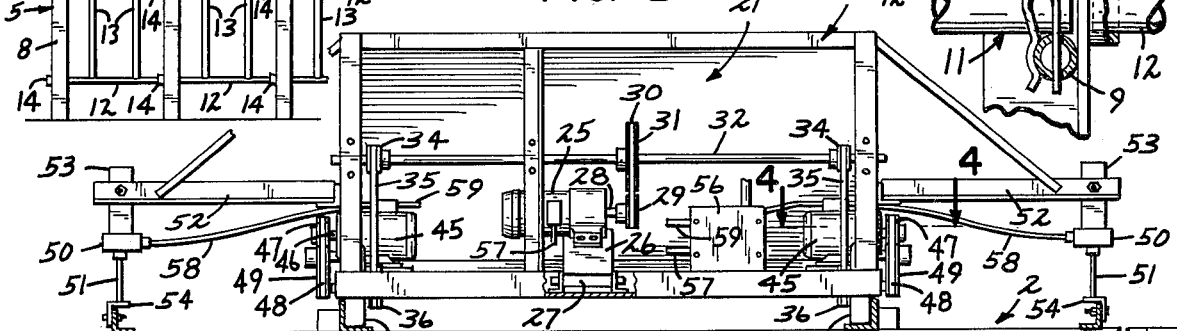
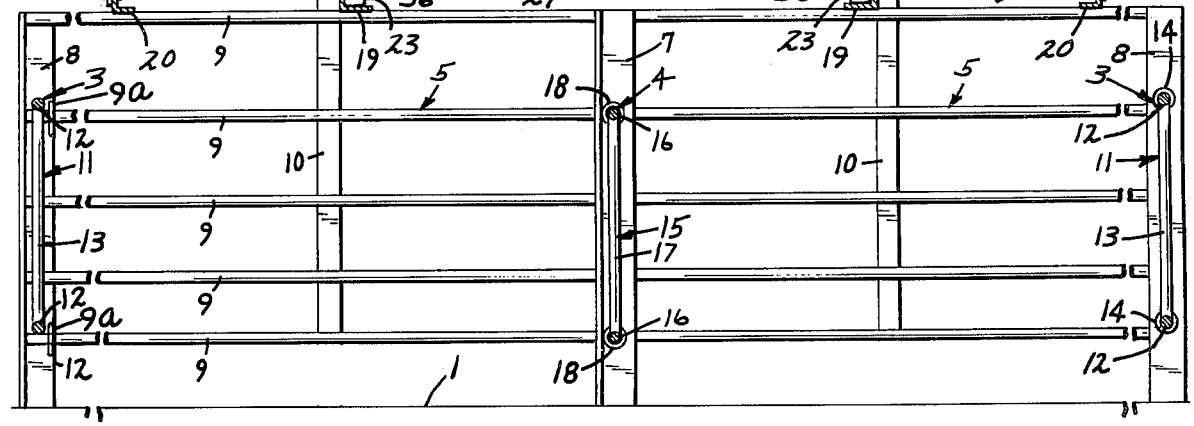

AUTOMATIC FEEDING SYSTEM FOR GESTATING LIVESTOCK

BACKGROUND OF THE INVENTION

This invention is in the nature of an improvement in feeding systems for feeding special diets to livestock, such as female animals, particularly sows, during their periods of gestation. The sows are placed in stalls and remain there until they are due to farrow. To improve performance and to decrease feed costs, the amount of feed each sow receives while in a stall is limited to a specific amount each day. The amount of feed depends on the weight and condition of the sow and the time remaining until farrowing. At present, sows in stalls are either hand fed or by the use of adjustable hoppers in each stall. The hoppers are usually filled by an auger conveyer. A disadvantage of both hand feeding and the auger hopper method of feeding is that a walkway is needed in front of each row of sows for hand feeding or adjusting the hoppers. The hand feeding of sows involves extra labor, and the use of auger fed hoppers is quite costly.

SUMMARY OF THE INVENTION

Our invention involves an open framework which includes laterally spaced parallel outer longitudinal frames, an intermediate longitudinal frame, and longitudinally spaced transverse frames connecting the longitudinal frames and cooperating therewith to define a pair of rows of open topped stalls. A pair of laterally spaced parallel rails extend longitudinally over the framework. A hopper has a pair of discharge openings each overlying a different row of the stalls adjacent the intermediate longitudinal frame, and wheel means on the hopper support the hopper on the rails for movement over the stalls. Power operated means is included for imparting rotation to the wheel means. A pair of conveyors in the bottom of the hopper are each disposed to deliver material from the hopper to a different one of the discharge openings, and separate drive means is provided for driving each of the conveyors independently of the other thereof. Separate control means individual to the separate drive means cause material from the hopper to be delivered to predetermined ones only of the stalls.

DESCRIPTION OF THE DRAWINGS

FIG. 1 is a fragmentary view in top plan of the automatic feeding system of this invention, some parts being broken away and some parts being shown in section;

FIG. 2 is an enlarged transverse section taken on the line 2—2 of FIG. 1;

FIG. 7 is a view in side elevation as seen from the line 7—7 of FIG. 1; and

FIG. 8 is an enlarged fragmentary section taken on the line 8—8 of FIG. 1.

DETAILED DESCRIPTION OF THE PREFERRED EMBODIMENT

Figure 3:
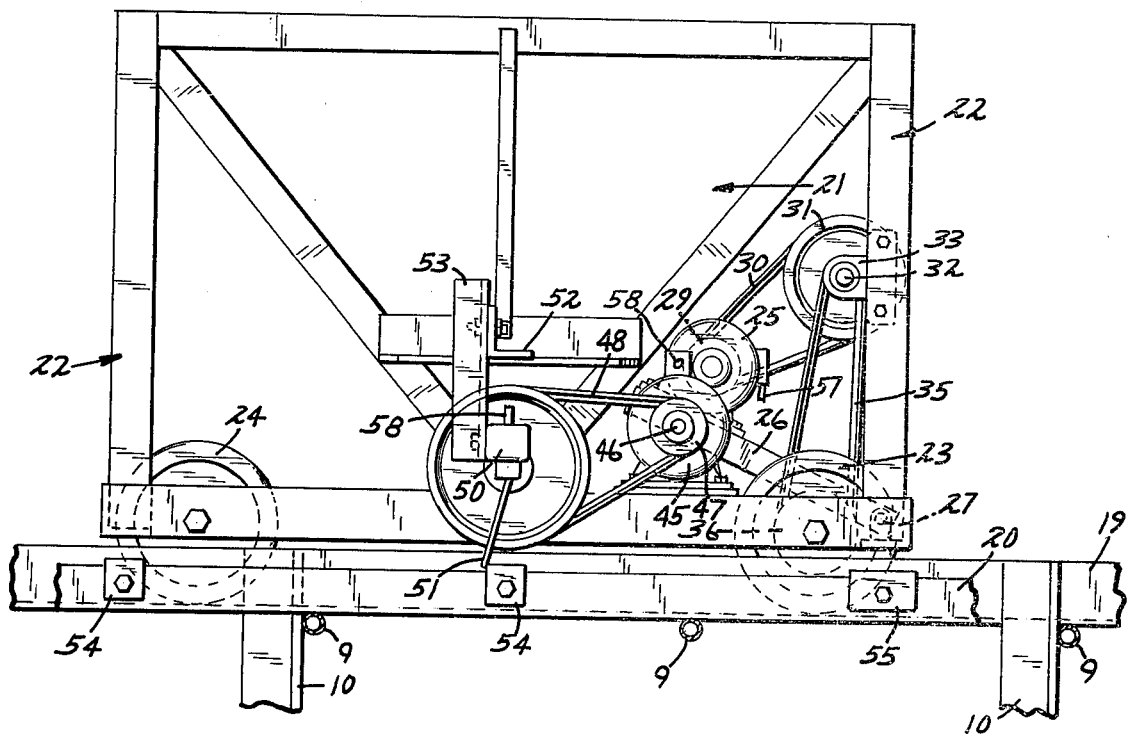
FIG. 3 is a further enlarged fragmentary view partly in side elevation and partly in section taken generally on the line 3—3 of FIG. 1.
Figure 4:
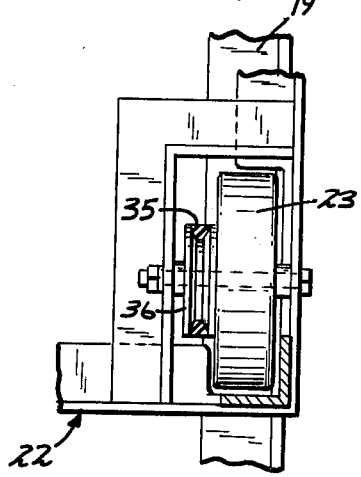
FIG. 4 is an enlarged fragmentary view partly in top plan and partly in section taken on the line 4—4 of FIG. 2.
Figure 5:
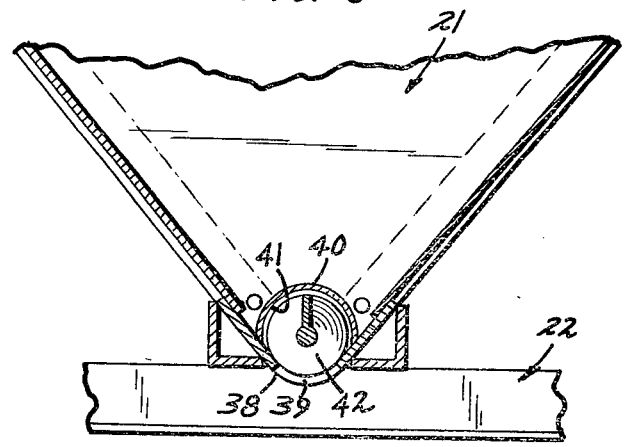
FIGS. 5 and 6 are enlarged fragmentary details in section, taken on the lines 5—5 and 6—6 respectively of FIG. 1.

In the drawings, the numeral 1 indicates the floor of a building structure, which supports an open frame work 2 that comprises spaced parallel outer longitudinal frames 3, an intermediate longitudinal position frame 4, and longitudinally spaced transverse frames 5 connecting the longitudinal frames 3 and 4 and defining therewith a pair of rows of open topped stalls 6. Each stall 6 is of a size to comfortably contain a gestating animal, such as a sow, not shown.

Each of the transverse frames 5 comprises a central upright leg 7, a pair of upright outer legs 8, and a plurality of vertically spaced generally horizontal tubular bars 9, welded or otherwise rigidly secured at their opposite ends to the outer legs 8 and at their generally central portions to the central leg 7. In the embodiment of the invention illustrated, the legs 7 and 8 are made from commercially available angle iron, and may be assumed to be rigidly secured at their lower ends to the floor 1. Intermediate the central leg 7 and outer legs 8, each transverse frame 5 is braced by vertical brace members 10 welded or otherwise rigidly secured to the bars 9.

Each of the outer frames 3 comprises a plurality of frame sections 11 that are removably secured to the outer ends of the transverse frames 5. Each frame section 11 comprises a pair of vertically spaced generally horizontal frame members 12 and horizontally spaced apart vertical frame members 13 that are welded or otherwise rigidly secured at their opposite ends to the frame members 12. At one end, the frame members 11 are loosely received in tubular sockets 14 that are welded to the legs 8, see particularly FIG. 8. The opposite end of each member 11 rests on one of the bars 9 and is releasably retained thereon by a hairpin clip 9a removably mounted in its respective bar 9 so that each section 11 may be easily removed from its sockets 14 to permit entrance of an animal to its respective stall 6 or exit of the animal therefrom.

Like the outer frames 3, the intermediate frame 4 comprises a plurality of intermediate frame sections 15, each of which includes vertically spaced horizontal frame members or bars 16 and laterally spaced vertical bars 17, each of which is welded or otherwise rigidly secured at its opposite ends to the horizontal bars 16. The central legs 7 are provided with sockets 18 similar to the sockets 14 for reception of opposite ends of the horizontal bars 16. It will be appreciated that, when sows are placed in the stalls 6, they will be preferably disposed with their heads adjacent the intermediate frame 4, so that they stand in generally head to head relationship.

The framework 2 is braced by a pair of laterally spaced parallel rails 19 extending generally longitudinally thereover, the rails 19 being preferably made from commercially available angle iron and secured to the uppermost tubular bars 9 and the upper ends of the brace members 10. A pair of support bars 20, also preferably made from commercially available angle iron, extend longitudinally between a different one of the outer frames 3 and a respective one of the rails 19 and parallel thereto, the support bars 20 being rigidly secured to the topmost ones of the horizontal bars 9.

The rails 19 support a mobile hopper 21 that is mounted in a frame 22 to which is journaled a pair of axially aligned support wheels 23 and a second pair of support wheels 24, one of which is shown in FIG. 3. The wheels 23 are driven from an electric motor 25 that is mounted on one end portion of a base member or bracket 26, the opposite end of which is pivotally mounted on the frame 22, as indicated at 27. The motor 25 is preferably of the geared head variety having an output shaft 28 on which is mounted a pulley 29 over which is entrained a first drive belt 30 that runs over a pulley 31 mounted fast on the intermediate portion of a jackshaft 32. The jackshaft 32 is journaled in bearings 33 mounted on the frame 22, one of the bearings 33 being shown in FIG. 3. A pair of other pulleys 34 are mounted fast on the jackshaft 32 adjacent the bearings 33 and have entrained thereover second endless drive belts 35 that are also entrained over pulleys 36 each operatively connected to a different one of the wheels 23. The jackshaft 32 is journaled intermediate its ends by another bearing, not shown, but which may be assumed to be secured to a frame member 37 forming a part of the hopper frame 22, (see particularly FIG. 2). The output speed of the geared head motor 25 and the relative diameters of the pulleys 29, 31, 34 and 36 are such that the wheels 23 are caused to rotate at a low speed to move the hopper 21 longitudinally of the rows of stalls 6 from one end to the other thereof. Operation of the motor 25 is controlled by suitable limit switches, not shown, but which may be assumed to be suitably placed adjacent the opposite ends of the support rails 19.

Figure 6:
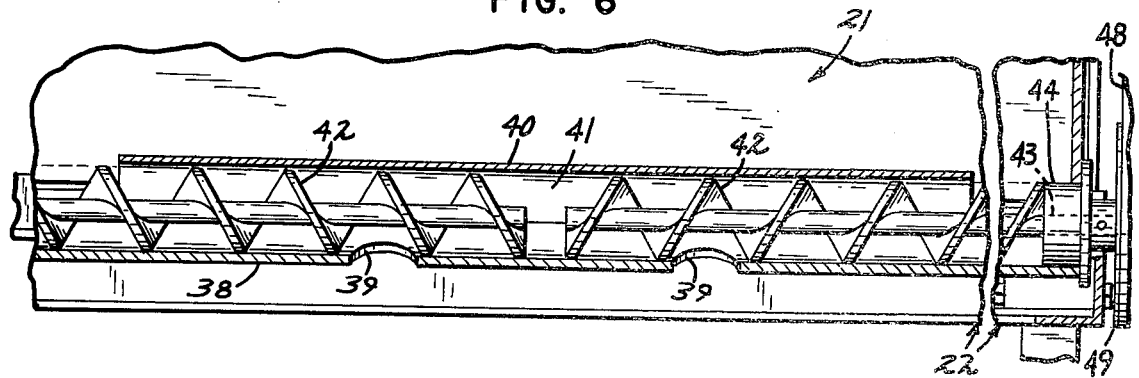

The hopper 21 has a cross-sectionally arcuate bottom 38 that extends generally transversely with respect to the rows of stalls 6, and which is provided with a pair of spaced discharge openings 39 each of which overlies a different row of stalls 6. A cross sectionally arcuate hood or baffle 40 overlies the arcuate bottom portion 38 and cooperates therewith to define a tubular passageway 41 along the bottom of the hopper 21. The opposite ends of the baffle 40 are inwardly spaced from their respective ends of the hopper 21 to provide for passage of material from the hopper 21 to the passageway 41. A pair of conveyors in the nature of augers 42 each extend from a different end of the hopper 21 inwardly of the passageway 41 and terminate at the longitudinally central part of the passageway 41, as shown in FIGS. 1 and 6. The augers 42 are operative to deliver material from the interior of the hopper 21 through the passageway 41 to respective ones of the discharge openings 39.

Each of the augers 42 has a shaft portion 43 that is journaled in a bearing 44 in the adjacent end of the hopper frame 22, one of the bearings 44 being shown in FIG. 6. Each of the augers 42 is driven by a respective one of a pair of drive motors 45 each mounted on a respective end of the hopper supporting frame 22, as shown in FIG. 2. The motors 45 are preferably of the geared head type and have drive shafts 46 on which are mounted drive pulleys 47. Endless drive belts 48 run over the pulleys 47 and over other pulleys 49 mounted fast on the ends of the auger shafts 43.

Means for controlling operation of the drive motors 45 includes a pair of control switches 50 having switch operating arms 51 depending therefrom, each of the switches 50 being disposed in overlying spaced relationship to a different one of the support bars 20, see particularly FIG. 2. Each switch 50 is supported from an opposite end of the hopper frame 22 by a different one of a pair of generally horizontal support arms 52 and legs 53 depending from the outer ends of the support arms 52. The control means for the motors 45 further includes a plurality of abutment elements or lugs 54 removably mounted on the support bars 20 in the path of travel of respective ones of the switch operating arms 51. The abutment lugs 54 are mounted on their respective support bars 20 only above stalls 6 that are occupied by animals to be fed. During movement of the hopper 21 longitudinally of the rows of stalls 6, the motors 45 are energized to cause delivery of feed to the selected stalls 6 only during engagement of the switch operating arms 51 by their respective abutment lugs 54. The amount of feed delivered to each stall 6 may be varied by using abutment lugs 54 of different dimensions longitudinally of the rows of stalls 6. One of the abutment lugs is shown in FIG. 3 as being longer than the others thereof, this lug being indicated at 55. The motor 25 is connected to other controls, not shown, but contained within control box 56 by means of a conductor cable 57. Conductor cables 58 extend between the motors 45 and their respective switches 50, and other cables 59 extend between the motors and the control box 56. The controls in the box 56 are of types well known to those skilled in the electrical art, and in and of themselves, do not comprise the instant invention. Hence, showing and description thereof is omitted in the interest of brevity.

With reference particularly FIGS. 1 and 2, it will be seen that the support bars 20 are sufficiently close to the outer frames 3 that it is an easy matter for the operator to reach the abutment lugs 54 and 55 to remove and/or replace them when necessary. Further, the overall construction of the framework 2 renders the same of easy erection and provides rows of stalls that are open for adequate ventilation and for easy cleaning. By using abutment lugs 54 and 55 of different sizes, the quantity of food delivered to each occupied stall 6 may be varied to suit the needs of the animal therein.

While we have shown and described a commercial embodiment of my automatic feeding system, it will be understood that the same is capable of modification without departure from the spirit and scope of the invention, as defined in the claims.

What is claimed is:

1. An automatic feeding system comprising:
   a. open framework including laterally spaced parallel outer longitudinal frames, an intermediate longitudinal partition frame, and longitudinally spaced transverse frames connecting said longitudinal frames and cooperating therewith to define a pair of rows of open topped stalls;
   b. a pair of laterally spaced parallel rails extending longitudinally over said framework;
   c. a hopper having a pair of discharge openings each overlying a different row of said stalls adjacent said intermediate longitudinal partition frame;
   d. wheel means on said hopper for supporting the hopper on said rails for movement over said stalls;
   e. power operated means for imparting rotation to said wheel means;
   f. a pair of conveyors in the bottom of said hopper each disposed to deliver material from the hopper to a different one of said discharge openings;
   g. separate drive means for driving each of said conveyors independently of the other thereof; and
   h. separate control means individual to said separate drive means for causing material from said hopper to be delivered to predetermined ones only of said stalls.

2. The automatic feeding system defined in claim 1, characterized by a pair of laterally spaced parallel support bars secured to said transverse frames at the tops thereof and extending longitudinally of said framework each between a different one of said outer longitudinal frames and a respective one of said rails, said control means comprising abutment elements removably mounted on said support bars in selected positions longitudinally thereof, and a pair of switch operating members carried by said hopper and each overlying a different one of said support bars for engaging with said abutment elements responsive to movements of said hopper longitudinally of said framework.

* * * * *

UNITED STATES PATENT AND TRADEMARK OFFICE
CERTIFICATE OF CORRECTION

PATENT NO. : 4,027,628
DATED : June 7, 1977
INVENTOR(S) : Robert M. Butler; John T. Butler and James Butler It is certified that error appears in the above-identified patent and that said Letters Patent are hereby corrected as shown below:

Column 2, line 7, the word "position" should be changed to the word --partition--.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*